(No Model.) 2 Sheets—Sheet 1.
J. M. SHUCK.
BEE HIVE.
No. 329,341. Patented Oct. 27, 1885.
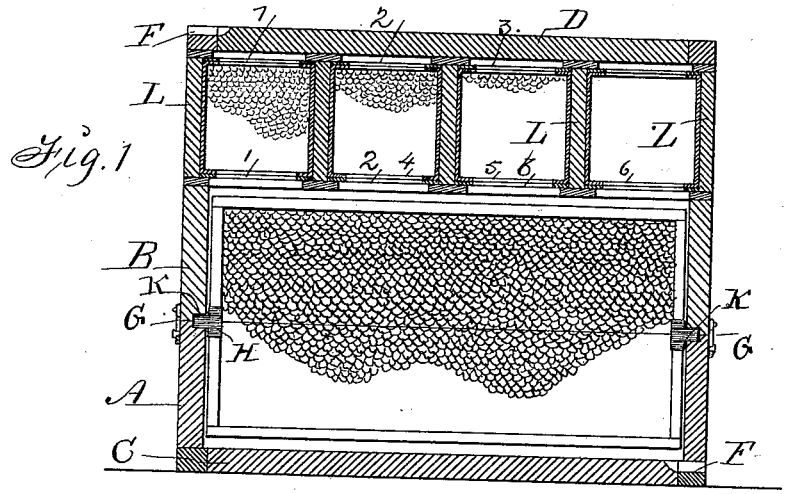
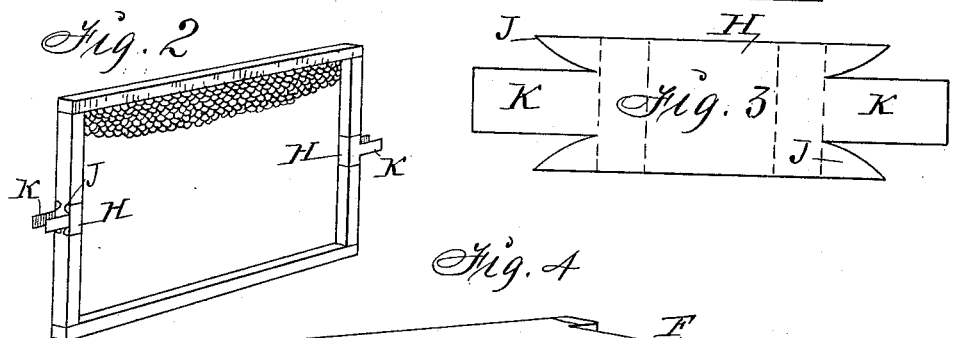
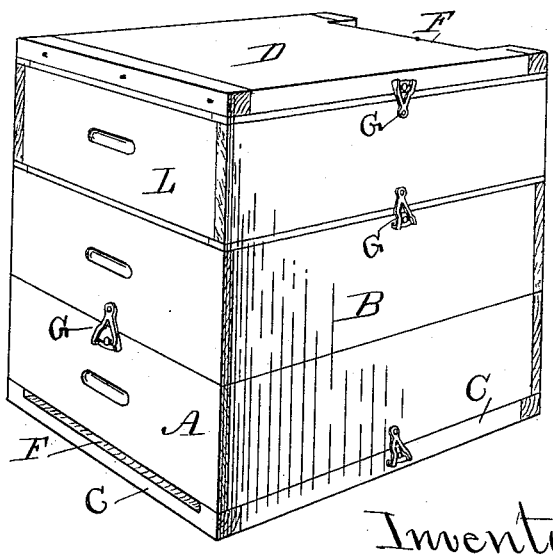
Witnesses:
W. T. Anderson
Orra C. Moore
Inventor:
John M. Shuck,
By Thomas G. Orwig, Atty.

(No Model.) 2 Sheets—Sheet 2.
J. M. SHUCK.
BEE HIVE.
No. 329,341. Patented Oct. 27, 1885.
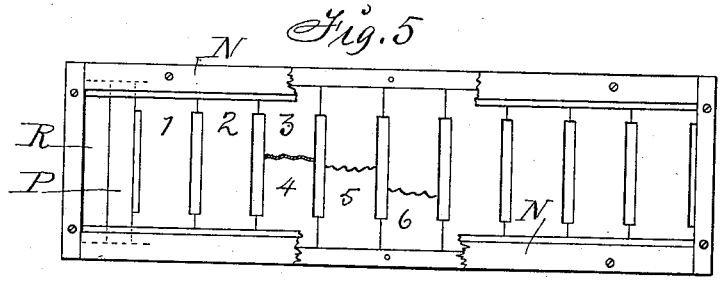
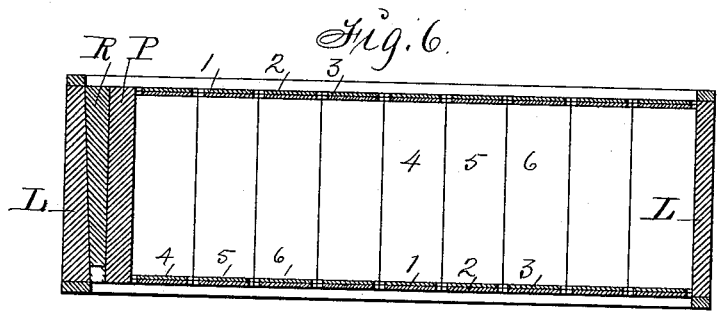
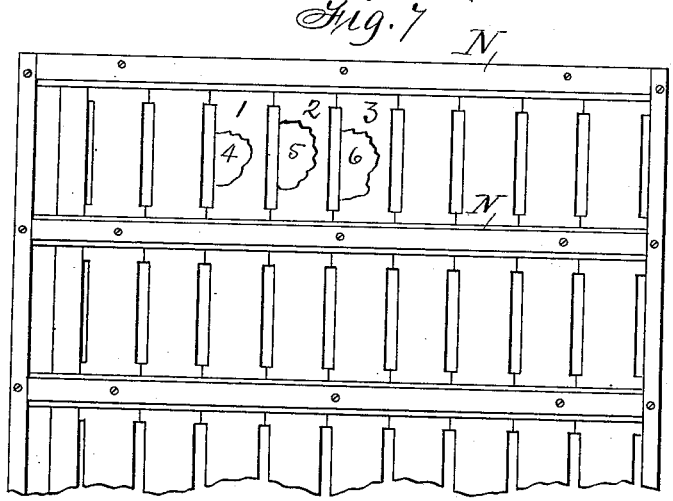
Witnesses:
M. T. Anderson,
Orra B. Moore.
Inventor:
John M. Shuck,
By Thomas G. Orwig, Atty.

United States Patent Office.

JOHN M. SHUCK, OF DES MOINES, IOWA.

BEE-HIVE.

SPECIFICATION forming part of Letters Patent No. 329,341, dated October 27, 1885.

Application filed July 11, 1884. Serial No. 137,425. (No model.)

*To all whom it may concern:*

Be it known that I, JOHN M. SHUCK, a citizen of the United States of America, and a resident of Des Moines, in the county of Polk and State of Iowa, have invented an Improved Bee-Hive, of which the following is a specification.

One cause of annoyance to bee-keepers is the imperfect filling of movable frames and surplus-honey sections by the bees. Bees naturally attach their combs to the top bars of frames, and also to the end bars of frames, the upper two-thirds of their length with great regularity and strength, but seldom attach the comb to the lower third of the end bars and the bottom bars of frames, if left to themselves; consequently, if the hive or frames are to be handled or transported or the honey to be shipped to market, the combs are liable to be broken and loss ensues. Another sour of annoyance and loss is the soiling of the outside surfaces of surplus-honey sections with propolis and other sticky substances.

My object is to overcome these difficulties, which are due to construction of hives as they are now made and understood; and my invention consists in the construction and combination of an invertible and divisible hive, invertible frames, and invertible cases, for surplus-honey sections, as hereinafter fully set forth, pointed out in my claims, and illustrated in the accompanying drawings, in which—

Figure 1 is a vertical transverse section of my hive; Fig. 2, a perspective view of my invertible frame; Fig. 3, an outline view of the metal blank used for forming the projecting arm in the center of the end bar of my invertible frame; Fig. 4, a perspective view of my hive closed and ready for use; Fig. 5, a top view of my invertible case for a single row of surplus-honey sections, and Fig. 6 a vertical longitudinal section of the same. Fig. 7 is a top view of a case adapted for three rows of surplus-honey sections. Fig. 8 is a perspective view of a surplus-honey section to be used in my invertible case.

A and B are two separable and mating rectangular walls of uniform size. They are preferably made of inch boards joined together in any suitable way, and may vary in dimensions as desired. The end pieces of each part are rabbeted at their inner and contiguous edges to receive, clamp, and rigidly fasten the projecting arms attached to the bars of the movable frames, as shown in Fig. 1, to support the frames, and at the same time to prevent any lateral motion or slipping of the frames when the hive is handled, inverted, or transported.

C and D are interchangeable and invertible boards adapted to close the top and bottom of the hive. Cleats on their ends hold the parts together and prevent them from warping and splitting.

F is a bee-passage when used at the bottom of the front of the hive, and a ventilator when at the top of the rear of the hive.

G represents locking devices, attached to the outside of the wall to fasten the two wall-sections together, and to fasten the top and bottom boards to the walls of the hive.

H H represent projecting arms on the end bars of the movable frames.

Heretofore honey-frames have been provided with angular projections at their top corners by pivoting the vertical downward extensions of such projections to the centers of the end pieces of the frames in such a manner that the frames could be suspended in a hive and then inverted by turning them on the round pivots, by which they were connected with the angular projections that extended horizontally from their upper corners; but my manner of providing a honey-frame with angular projections, adapted to be clamped fast to a hive so that the frames can be inverted with the hive without becoming displaced, is novel and greatly advantageous. They may be made from blanks cut from sheet metal and bent around the end bars of the movable frames, and fastened thereto by driving the sharp points J into the wood, as shown in Fig. 2, and allowing the ends K to project outward and in parallel position, to adapt them to engage the supporting-rabbets in the wall, as shown in Fig. 1.

L represents the wall of my invertible surplus case adapted to be placed on the top of a hive, as shown in Figs. 1 and 4.

N N represent detachable strips fixed to the edges of the walls of the case by means of screws or in any other suitable way in such a manner that they will extend inward to support the susplus-honey sections. After removing the strips N from the top of the wall of the case, I place a series of thin pieces of wood, 1 2 3, that correspond in size and shape with the tops and bottoms of the surplus-honey sections, into the case to rest upon the inward extensions of the strips N. I next place a series of surplus-honey sections, 4 5 6, upon the series of wood veneers 1 2 3 upon the tops of the surplus-honey sections. Then to fasten the sections and veneers firmly together in the case the strips N, removed at the beginning of this operation, are now replaced and attached by screws, as at first. The top and bottom of the case of surplus-honey sections and veneers as now made up are uniform, and may be used either top or bottom up with equal benefit. The outside faces of the vertical parts of the surplus-honey sections will be covered by the walls and partitions of the case with which they are in close contact, and the outside faces of the horizontal parts of the same sections will be covered by the veneers 1 2 3, and thus the outside faces of the sections will be protected from the travel and deposits of the bees, and will therefore have a greater market value by reason of their clean and neat appearance. The sections and veneers are clamped fast and held in place by the overlapping edges of the strips N, fixed on the top and bottom edges of the wall.

To press the surplus-honey sections in the case tightly together, a board or follower, P, may be placed against the section at the end of the row, and a wedge, N, pressed down between the follower and the fixed end of the case, as is clearly shown in Fig. 6.

In the practical use of the invertible surplus case when it is placed upon the top of the hive and the upper portions of the honey-sections are filled with comb and honey, and the lower parts incomplete and partially empty, I simply invert the case with its contents, and the bees will then, guided by their instinct, fill the empty portions of the sections in a most perfect manner. To accomplish a similar result with the movable frames in the hive, I remove the upper half of the hive to release the frames, so they can then be lifted separately and inverted at will, and the removed half of the hive is then replaced and again properly secured. To accomplish a similar result without disturbing the movable frames, the top board, D, may be adjusted so as to form a bee-passage at the top of the rear of the hive, (if this passage is not already in use as a ventilator,) and the hive and frames then jointly inverted at one operation. The board D, thus brought to the top, may then remain as it is, the passage serving as a ventilator; or it may be inverted and the hive closed.

For wintering in cold climates, either out of doors or in special repositories, this method of ventilation is convenient and effectual.

I am aware that a diamond-shaped frame has had projections extending outward from opposite corners to suspend the frame and to facilitate its adjustment; but in no instance has a honey-frame been provided with arms or projections that extended outward horizontally in opposite directions, and in the same plane from the middle portions of the ends of a frame, for the purpose of suspending, fastening, and inverting the frame at pleasure, as and for the purposes contemplated by my invention.

I claim as my invention—

1. The combination of angular arms or projections with the ends of a movable honey-frame for bee-hives, said arms or projections extending horizontally in opposite directions from the ends of the axis of the frame and in the plane of said axis, to suspend, fasten, and invert the frame in a hive, in the manner set forth, for the purposes stated.

2. A comb-frame provided with sheet-metal plates H, having projecting points J, and ends K, projecting from between said points, and the said plates fastened to the frame, as shown and described, for the purposes stated.

3. The combination of the wall L, the strips N, the series of removable veneers 1 2 3, and a series of removable surplus-honey sections, 4 5 6, for the purposes stated.

4. An invertible bee-hive composed of two separable mating wall-sections, each having supports for invertible frames at the inner edges of their ends, two detachable boards, each having a passage cut in one of its edges, and a series of invertible frames each having fixed outward projecting arms on the center of its side bars, to operate in the manner set forth, for the purposes specified.

5. A movable frame for bee-hives, having arms or projections extending horizontally from the opposite ends of its axis and in the plane of said axis, in combination with separable mating sections of the wall of a bee-hive, having rabbets in their mating edges adapted to receive the projections on the ends of the frame, for the purposes stated.

JOHN M. SHUCK.

Witnesses:
JAMES G. BERRYHILL,
GEO. F. HENRY.